Patented Apr. 15, 1952

2,592,901

UNITED STATES PATENT OFFICE 2,592,901

ETHYLIDENE BIS-(ALLYL ADIPATE) AND OTHER ACYLALS

Charles D. Hurd, Evanston, Ill., assignor, by mesne assignments, to Columbia-Southern Chemical Corporation, Pittsburgh, Pa., a corporation of Delaware No Drawing. Application November 26, 1946, Serial No. 712,238

1 Claim. (Cl. 260—485)

This invention relates to novel polymerizable acylals, to their polymers and to methods of producing such esters and polymers. In accordance with the present invention polymerizable acylals of (a) the theoretical ethylidene glycol, $CH_3—CH(OH)_2$, and (b) acid esters of dicarboxylic acids and unsaturated monohydric alcohols such as allyl alcohol have been provided. These acylals polymerize readily to form polymers which are substantially insoluble or are difficultly soluble in organic solvents and generally are comparatively infusible. They maye be prepared by reaction of acetylene with the acid ester of the dicarboxylic acid in the presence of catalytic quantities of boron trifluoride and mercuric oxide. The reaction apparently proceeds by addition in accordance with the equation

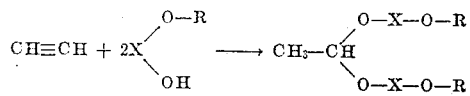

where R represents the radical of the olefinic monohydric alcohol ROH, X is a radical of the group consisting of

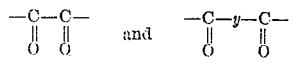

and y is a bivalent organic radical having an uninterrupted carbon chain linking the carbonyl groups.

Esters of various dicarboxylic acids may be prepared by this process including the esters of oxalic, succinic, chloromaleic, adipic, azelaic, pimelic, sebacic, benzene dicarboxylic acids such as phthalic, maleic, fumaric, muconic, chloromaleic and itaconic acids. Of particular interest are the acylals of those acids which contain 2 or more carbon atoms between the carboxyl groups thereof.

The preparation of the monomeric compounds of the invention usually is accomplished at temperatures ranging from 30 to 40° C. Lower temperatures result in decreased yields while violent reactions occur at more elevated temperatures. Extending the reaction over long time intervals may result in multiple side reactions and polymerization of the monomers formed. The time of reaction may be any period necessary to insure complete reaction of the components. Best results are obtained when the reaction is allowed to progress from 15 to 30 hours.

Manganese dioxide or other polymerization inhibitor may be added during the reaction to inhibit polymerization of the monomer if desired. Diluents such as dioxane have been employed but appear to increase the amount of vinyl ester and to decrease the yield of ethylidene ester.

In the performance of the process, the monoallyl ester of the dibasic acid selected is mixed with a small amount of mercuric oxide while additional small amounts of boron trifluoride solution and hydrofluoric acid are also added at the beginning of the reaction with or without organic solvent. The mixture is then saturated with acetylene gas at temperatures ranging from 30 to 40° C. It darkens and turns black as acetylene is added. The reaction is one of addition according to the apparent reaction

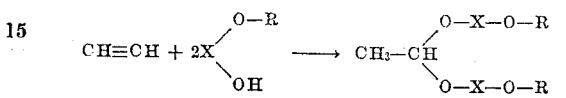

After a sufficient amount of acetylene has been absorbed to combine with all of the monoallyl ester, addition of acetylene is discontinued. The mixture is made alkaline with an alkali such as sodium bicarbonate and extracted with a solvent such as ether. The extract, which contains some mixed allyl vinyl ester of the dibasic acid used as well as the ethylidine derivative is washed with water and dried with calcium sulfate or an equivalent drying agent. After removal of the drier, a small amount of a polymerization inhibitor such as cuprous chloride is added and the ethereal solution is fractionally distilled at reduced pressure. The vinyl derivative is removed as a relatively low boiling fraction and thereafter the ethylidine diallyl ester is recovered generally as an intermediate fraction. Further purification of the compound obtained can be made by vacuum distillation in a Vigreux column.

The following examples are illustrative of the invention:

Example 1

Into 73.2 grams of allyl hydrogen adipate was dissolved 1.46 grams of mercuric oxide. In order to conveniently introduce the boron trifluoride into the reaction, 0.65 grams of boron trifluoride was dissolved in 4.08 grams of allyl hydrogen adipate, which solution was added dropwise during the reaction. To the mixture of dissolved mercuric oxide in allyl hydrogen adipate was added 20 drops of the boron trifluoride solution and 4 drops of 47% hydrofluoric acid. Acetylene is then bubbled into the mixture and the temperature permitted to rise to approximately 30° C. Intermittently, as the reaction rate decreases several drops of the boron trifluoride solution together with several drops of hydrofluoric acid were added. To inhibit polymerization .073 grams of manganese dioxide is added and 105 ml. of dry dioxane are added as a diluent about 40 minutes after the reaction was initiated. The reaction progressed until 10.5 liters of acetylene have been absorbed. The reaction time in this case amounted to 30 hours. The total amount of boron fluoride added was 0.26 grams; of allyl hydrogen adipate, 77.08 grams; of hydrofluoric acid, 23 drops. The reaction solution was made alkaline with sodium bicarbonate and the ethylidine derivative, in this case ethylidene bis (allyl adipate) was removed by extraction with ether. The product was distiled at 3 mm. pressure and the crude ethylidene adipate recovered at 145 to 175° C. in a yield amounting to 9.08 grams. This product may be purified by dissolving in ether and washing with aqueous sodium bicarbonate solution and redistilling. The purified compound is a yellow oily liquid which has a boiling point of about 20° C. at 1 mm. pressure. The probable structure of this compound is

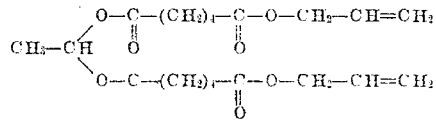

The compound polymerizes in the presence of 5 percent by weight benzoyl peroxide, when heated at 70° C. for 72 hours, to form a hard solid polymer which is essentially insoluble in organic solvents.

Example 2

A mixture of 85 grams of allyl hydrogen succinate and 1.5 grams of mercuric oxide was heated on a water bath at 75° C. At the beginning of the reaction, 0.3 grams of boron trifluoride, dissolved in 2 grams of allyl hydrogen succinate was added together with 10 drops of 47% hydrofluoric acid. Acetylene was bubbled into the mixture and the reaction started immediately. At this time 25 ccs. of dioxane and 0.2 gram of hydroquinone was added and the temperature rose to 42° C. A solution of 0.1 gram of boron trifluoride in 1 gram of hydrogen allyl succinate is added toward the end of the reaction. A total of 32 drops of hydrofluoric acid was used during the reaction period of 24 hours. Fifteen liters of acetylene was absorbed as compared to the theoretical amount of 13.4 liters. After addition of acetylene was over, the reaction mixture was made alkaline with sodium bicarbonate, and then extracted with ether to obtain the ethylidene derivative. This ethereal fraction, which contained allyl vinyl succinate as well as the ethane derivative, was distilled and the portion distilling at approximately 185 to 220° C. at 7.5 mm. pressure was found to be the crude 1-1' bis (carballyloxy ethylene carboxy) ethane. The yield amounts to 24 grams. Upon purification of the crude product redissolving in ether, washing successively with aqueous sodium bicarbonate, dilute hydrochloric acid and water and then redistilling in the presence of hydroquinone at 3 mm. pressure, the purified compound which is a yellow oily liquid was recovered at 186-187° C.

This compound has the probable structure

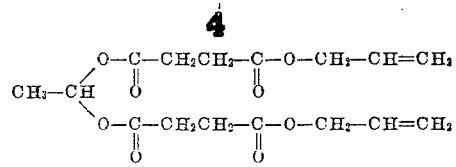

This compound polymerizes in the presence of 5% by weight benzoyl peroxide when heated at 70° C. for 72 hours to form a hard yellow insoluble polymer.

The above examples illustrate one method by which allyl esters may be prepared. These esters also may be prepared by reaction of allyl vinyl mixed esters such as vinyl allyl maleate at reflux temperature with a maleic half ester such as allyl hydrogen maleate in the presence of an esterification catalyst such as p-toluene sulfonic acid.

Corresponding esters of other unsaturated polymerizable alcohols containing 2 or more carbon atoms and with the beta carbon atom linked by an unsaturated bond to an adjacent carbon atom (preferably containing the polymerizable groups $CH_2=C=$ such as the corresponding esters of methallyl, 2 chloroallyl, cinnamyl 1,3, butadienyl, 2 phenyl allyl, methyl vinyl carbinyl, 3 butenyl, 4 pentenyl alcohols or 3 chlorobutene-2 ol-1 may be prepared. Such esters may be polymerized alone or with other polymerizable materials including methyl methacrylate, vinyl acetate, styrene, glycol maleate or fumarate, etc. to form desirable polymers or copolymers.

Polymerization of the above unsaturated esters may be accomplished by heating in the presence of peroxide catalysts such as 1-5% by weight benzoyl peroxide at suitable temperatures, for example 70-75° C. for 48-72 hours. Polymerization transforms the monomers into substantially insoluble, usually substantially infusible hard resinous substances. Resistance to the action of solvents and thermal stability make the polymers useful in applications where thermoset resins find special utility.

Although the present invention has been described with reference to specific details of certain embodiments thereof, it is not intended that such details shall be regarded as limited upon the scope of the invention except so far as included in the accompanying claim.

I claim:

A method of preparing an ethylidene acylal which comprises mixing acetylene with an acid ester of a dicarboxylic acid and an unsaturated monohydric alcohol having from 2 to 9 carbon atoms, while said acid ester is in contact with catalytic amounts of mercuric oxide and boron trifluoride, continuing the reaction for a period of from 15 to 30 hours, and recovering the resulting ethylidene acylal.

CHARLES D. HURD.

REFERENCES CITED

The following references are of record in the file of this patent:

UNITED STATES PATENTS

| Number | Name | Date |
|---|---|---|
| 1,306,964 | Koetschet et al. | June 17, 1919 |
| 2,153,987 | Nicodemus et al. | Apr. 11, 1939 |
| 2,371,990 | Hanford | Mar. 20, 1945 |
| 2,379,251 | Muskat et al. | June 26, 1945 |